(12) United States Patent
Wu et al.

(10) Patent No.: US 10,484,544 B2
(45) Date of Patent: Nov. 19, 2019

(54) METHOD AND SYSTEM FOR ADJUSTING VOLUME OF CONFERENCE CALL

(71) Applicants: Yi-Chang Wu, Taipei (TW); Po-Yueh Lan, Taipei (TW); Ming-Che Weng, Taipei (TW); Chang-Yuan Wu, Taipei (TW); Chih-Yuan Lin, Taipei (TW)

(72) Inventors: Yi-Chang Wu, Taipei (TW); Po-Yueh Lan, Taipei (TW); Ming-Che Weng, Taipei (TW); Chang-Yuan Wu, Taipei (TW); Chih-Yuan Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 221 days.

(21) Appl. No.: 15/166,280

(22) Filed: May 27, 2016

(65) Prior Publication Data

US 2016/0352913 A1 Dec. 1, 2016

Related U.S. Application Data

(60) Provisional application No. 62/167,869, filed on May 28, 2015.

(51) Int. Cl.
*H04M 3/56* (2006.01)
*H04L 29/06* (2006.01)
*G10L 21/0316* (2013.01)

(52) U.S. Cl.
CPC .......... *H04M 3/568* (2013.01); *H04L 65/403* (2013.01); *G10L 21/0316* (2013.01)

(58) Field of Classification Search
CPC ........ H04M 3/56; H04M 3/568; H04N 7/147; H04N 7/15; H04N 7/142; H04N 7/152

USPC ...................................... 379/202.01; 455/416
See application file for complete search history.

(56) References Cited

U.S. PATENT DOCUMENTS

| 8,670,537 | B2 | 3/2014 | Metzger et al. |
| 8,948,059 | B2* | 2/2015 | Rodman ................. H04L 12/66 370/261 |
| 9,350,869 | B1* | 5/2016 | Lasser ................... H04M 3/563 |
| 2009/0086013 | A1* | 4/2009 | Thapa ..................... H04N 7/15 348/14.08 |

(Continued)

FOREIGN PATENT DOCUMENTS

CN 1484421 3/2004

OTHER PUBLICATIONS

"Office Action of Taiwan Counterpart Application", dated Mar. 22, 2017, p. 1-p. 6, in which the listed references were cited.

*Primary Examiner* — Rasha S Al Aubaidi
(74) *Attorney, Agent, or Firm* — JCIPRNET

(57) ABSTRACT

A method and a system for adjusting a volume of a conference call are provided. The system includes at least one sub-device and a host. The host respectively connects the at least one sub-device and detects a number of the connected sub-devices. The host adjusts a volume of an original voice signal received from an external device according to the number of the connected sub-devices to generate an adjusted voice signal adapted to each sub-device and provides the same to each sub-device to play. The host also adjusts volumes of the original voice signals received by the host and each sub-device, integrates the adjusted original voice signals into an integrated voice signal adapted to the external device, and provides the same to the external device to play.

8 Claims, 7 Drawing Sheets

(56) References Cited

U.S. PATENT DOCUMENTS

| | | | |
|---|---|---|---|
| 2011/0016310 A1* | 1/2011 | Yong | G06F 21/57 |
| | | | 713/155 |
| 2011/0274293 A1* | 11/2011 | Yue | H04M 1/60 |
| | | | 381/107 |
| 2015/0112668 A1 | 4/2015 | Peng et al. | |
| 2016/0316064 A1* | 10/2016 | Ohman | H04M 3/568 |

* cited by examiner

METHOD AND SYSTEM FOR ADJUSTING VOLUME OF CONFERENCE CALL

CROSS-REFERENCE TO RELATED APPLICATION

This application claims the priority benefits of U.S. provisional application Ser. No. 62/167,869, filed on May 28, 2015. The entirety of the above-mentioned patent application is hereby incorporated by reference herein and made a part of this specification.

BACKGROUND OF THE INVENTION

Field of the Invention

The invention relates to a volume adjusting method and system, and particularly relates to a method and a system for adjusting a volume of a conference call.

Description of Related Art

A conference call is a novel conference type that adopts devices having a call function such as telephones, or personal computers to have a meeting, which breaks through spatial limitation of a conventional conference, and allows the participants in different conference rooms, offices, homes and even abroad to hold or participate the conference. Compared to a conventional point-to-point calling manner, the conference call also breaks through two-party limitation of calling parties, allows multiple calling parties to simultaneously participate in the conference, and even allows multiple persons to use different calling devices to join in the conference at each of the calling parties.

In case that multiple persons are gathered in a same place and respectively use the calling devices to participate in the conference call, a voice input from external is played on all of the calling devices, and since the calling devices are closer to each other and the played content is the same, volumes of the played voice have an summation effect, which may result in an excessive play volume. Similarly, the voice of each person can also be collected by all of the calling devices, and the volumes of the voices collected by the calling devices may also have the summation effect, which causes an excessive volume of the voice received by the other calling party.

SUMMARY OF THE INVENTION

The invention is directed to a method and a system for adjusting a volume of a conference call, in case that a plurality of calling devices at a same place join the conference call, a volume played on each of the calling devices or a volume collected by each of the calling devices is properly adjusted according to a number of the calling devices, so as to avoid a problem of excessive play volume.

The invention provides a method for adjusting a volume of a conference call, which is adapted to adjust volumes of a host and at least one sub-device in the conference call. In the method, the host respectively connects the at least one sub-device and detects a number of the connected sub-devices. Next, the host receives an original voice signal from an external device. Then, the host adjusts a volume of the original voice signal according to the number of the connected sub-devices to generate an adjusted voice signal adapted to each of the sub-devices. Finally, the host respectively provides the adjusted voice signal to the sub-devices to play.

In an embodiment of the invention, the step that the host adjusts the volume of the original voice signal according to the number of the connected sub-devices to generate the adjusted voice signal adapted to each of the sub-devices includes following steps. The host inquires a volume mapping table to obtain a volume threshold corresponding to the number of the sub-devices, determines whether the volume of the original voice signal exceeds the volume threshold, and decreases the volume of the original voice signal according to the volume threshold to generate the adjusted voice signal adapted to each of the sub-devices if the volume of the original voice signal exceeds the volume threshold.

In an embodiment of the invention, the step of decreasing the volume of the original voice signal according to the volume threshold by the host to generate the adjusted voice signal adapted to each of the sub-devices includes a following step. The host decreases the volume of the original voice signal to the volume threshold to serve as the adjusted voice signal adapted to each of the sub-devices.

In an embodiment of the invention, the step of decreasing the volume of the original voice signal according to the volume threshold by the host to generate the adjusted voice signal adapted to each of the sub-devices includes following steps. The host obtains a decibel (dB) capable of being produced by a loudspeaker of each of the sub-devices. The host decreases the volume of the original voice signal according to a proportion of the decibels of the sub-devices to generate the adjusted voice signal adapted to each of the sub-devices.

The invention provides a method for adjusting a volume of a conference call, which is adapted to adjust volumes of a host and at least one sub-device in the conference call. In the method, the host respectively connects the at least one sub-device and detects a number of the connected sub-devices. Next, the host adjusts volumes of original voice signals received by the host and each of the sub-devices according to the number of the connected sub-devices to generate adjusted voice signals. Then, the host integrates the original voice signals or the adjusted voice signals of the host and the sub-devices to generate an integrated voice signal adapted to an external device. Finally, the host provides the integrated voice signal to the external device to play.

In an embodiment of the invention, the step of adjusting the volumes of the original voice signals received by the host and each of the sub-devices according to the number of the connected sub-devices to generate the adjusted voice signals includes following steps. The original voice signals of each of the sub-devices are received. The volumes of the original voice signals of the host and each of the sub-devices are adjusted to generate the adjusted voice signals according to the number of the connected sub-devices.

In an embodiment of the invention, the step that the host adjusts the volumes of the original voice signals received by the host and each of the sub-devices according to the number of the connected sub-devices to generate the adjusted voice signals includes following steps. The host inquires a volume mapping table to obtain a volume threshold corresponding to the number of the sub-devices, determines whether the volumes of the original voice signals of the host and each of the sub-devices exceed the volume threshold, and decreases the volumes of the original voice signals to the volume threshold to generate the adjusted voice signals if the volumes of the original voice signals exceed the volume threshold.

In an embodiment of the invention, the step that the host adjusts the volumes of the original voice signals received by the host and each of the sub-devices according to the number of the connected sub-devices to generate the adjusted voice signals includes following steps. The host transmits the number of the connected sub-devices to each of the sub-devices, and each of the sub-devices adjusts the volume of the original voice signal according to the number of the sub-devices to generate the adjusted voice signal, and transmits the adjusted voice signal to the host.

In an embodiment of the invention, the step that each of the sub-devices adjusts the volume of the original voice signal according to the number of the sub-devices to generate the adjusted voice signal includes following steps. Each of the sub-devices inquires a volume mapping table to obtain a volume threshold corresponding to the number of the sub-devices, determines whether the volume of the original voice signal exceeds the volume threshold, and decreases the volume of the original voice signal to the volume threshold to generate the adjusted voice signal if the volume of the original voice signal exceeds the volume threshold.

The invention provides a conference call volume adjusting system including at least one sub-device and a host. The host connects the at least one sub-device respectively and detects a number of the connected sub-devices. The host adjusts a volume of an original voice signal received from an external device according to the number of the connected sub-devices to generate an adjusted voice signal adapted to each of the sub-devices, and provides the adjusted voice signal to the sub-devices to play. The host adjusts volumes of original voice signals received by the host and each of the sub-devices according to the number of the sub-devices, integrates the original voice signals into an integrated voice signal adapted to the external device, and provides the integrated voice signal to the external device to play.

In an embodiment of the invention, the host inquires a volume mapping table to obtain a volume threshold corresponding to the number of the sub-devices, determines whether the volume of the original voice signal exceeds the volume threshold, and decreases the volume of the original voice signal according to the volume threshold to generate the adjusted voice signal adapted to each of the sub-devices if the volume of the original voice signal exceeds the volume threshold.

In an embodiment of the invention, the host decreases the volume of the original voice signal to the volume threshold to serve as the adjusted voice signal adapted to each of the sub-devices.

In an embodiment of the invention, the host obtains a decibel (dB) capable of being produced by a loudspeaker of each of the sub-devices, and decreases the volume of the original voice signal according to a proportion of the decibels of the sub-devices to generate the adjusted voice signal adapted to each of the sub-devices.

In an embodiment of the invention, the host receives the original voice signals of each of the sub-devices, and adjusts the volumes of the original voice signals of the host and each of the sub-devices according to the number of the connected sub-devices.

In an embodiment of the invention, the host inquires a volume mapping table to obtain a volume threshold corresponding to the number of the sub-devices, determines whether the volumes of the original voice signals of the host and each of the sub-devices exceed the volume threshold, and decreases the volumes of the original voice signals to the volume threshold if the volumes exceeds the volume threshold.

In an embodiment of the invention, the host transmits the number of the connected sub-devices to each of the sub-devices, and each of the sub-devices adjusts the volume of the original voice signal according to the number of the sub-devices for transmitting to the host.

In an embodiment of the invention, each of the sub-devices inquires a volume mapping table to obtain a volume threshold corresponding to the number of the sub-devices, determines whether the volume of the original voice signal exceeds the volume threshold, and decreases the volume of the original voice signal to the volume threshold if the volume of the original voice signal exceeds the volume threshold.

According to the above description, in the method and the system for adjusting a volume of a conference call, regarding a plurality of devices participating in the conference call in a same place, through the coordination of the host, the voice to be played by each of the sub-devices is properly attenuated, such that a summation of the volumes of the voice signals played or collected by the devices is still within a proper range, so as to avoid the problem of excessive play volume in the conference call.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

As a summation of volumes of voice signals played or collected by a plurality of devices in a same place is influenced by a magnitude of the number of the devices and a magnitude of a decibel of each loudspeaker, in the invention, a host is adopted to connect other sub-devices to establish a conference call, and the number of the connected sub-devices is confirmed in advance. When a voice signal transmitted from an external device is received, the host may determine an acceptable volume threshold according to a predetermined "device number and volume upper limit" database, so as to properly adjust and distribute a volume to be played on each of the sub-devices to avoid a problem of excessive volume. Similarly, regarding the voice signals received by the sub-devices, the host may also properly adjust and integrate the volumes of the voice signals collected from the host and each of the sub-devices according to a predetermined volume threshold, such that a volume of the integrated voice signal output to the external device is also maintained within a proper range.

Figure 1:
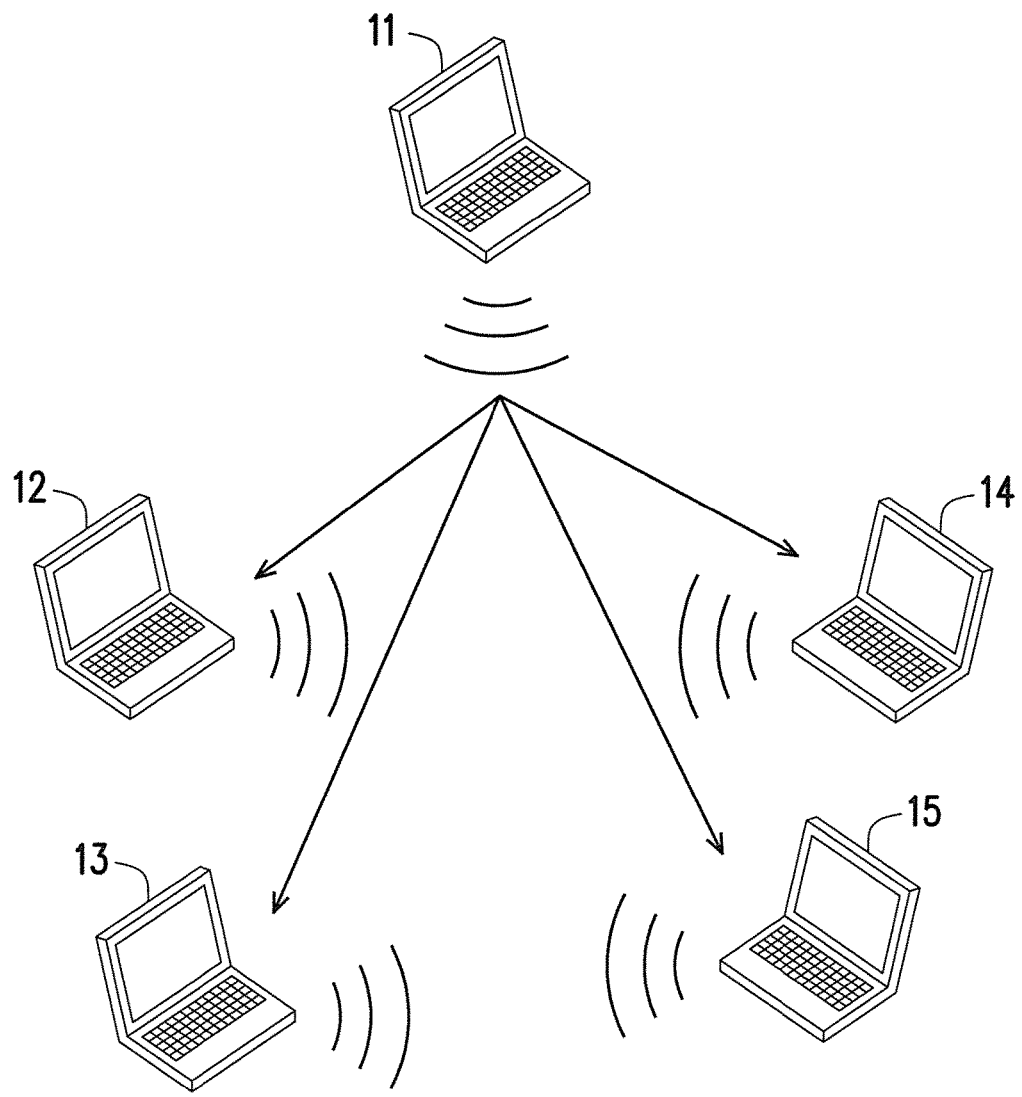
FIG. 1 is a schematic diagram of a conference call volume adjusting system according to an embodiment of the invention.

FIG. 1 is a schematic diagram of a conference call volume adjusting system according to an embodiment of the invention. Referring to FIG. 1, the conference call volume adjusting system 10 of the present embodiment includes a host 11 and a plurality of sub-devices 12-15. In the present embodiment, the host 11 and the sub-devices 12-15 are, for example, notebooks, and in other embodiments, the host 11 and the sub-devices 12-15 can also be other electronic devices having a call function such as telephones, mobile phones, tablet computers, or desktop computers, which is not limited by the invention.

In an embodiment, the host 11 and the sub-devices 12-15, for example, support a wireless communication technique such as wireless fidelity (Wi-Fi), Wi-Fi Direct, Bluetooth, Near Field Communication (NFC), Radio Frequency Identification (RFID), Infrared (IR), or Zigbee, and wireless connections can be established therebetween for transmitting data. In other embodiments, the host 11 and the sub-devices 12-15 may also establish wired connections for transmitting data through interfaces such as Ethernet, Universal Serial Bus (USB), Firewire, or Thunderbolt, though the invention is not limited thereto.

Moreover, the host 11 and the sub-devices 12-15 are further configured with microphones and loudspeakers for receiving or playing audio signals, especially voice signals of a call. The host 11 and the sub-devices 12-15, for example, further include displays used for displaying information, memories or hard disks used for storing data, processors used for executing a call function, and other hardware devices used for assisting in a call, which is not limited by the invention.

It should be noted that a volume of a conference call of the invention can be divided into a volume received from an external device and played on the host 11 and each of the sub-devices, and volumes received by the host and each of the sub-devices and integrated by the host 11 for outputting to the external device. Embodiments are provided below for further description.

Figure 2:
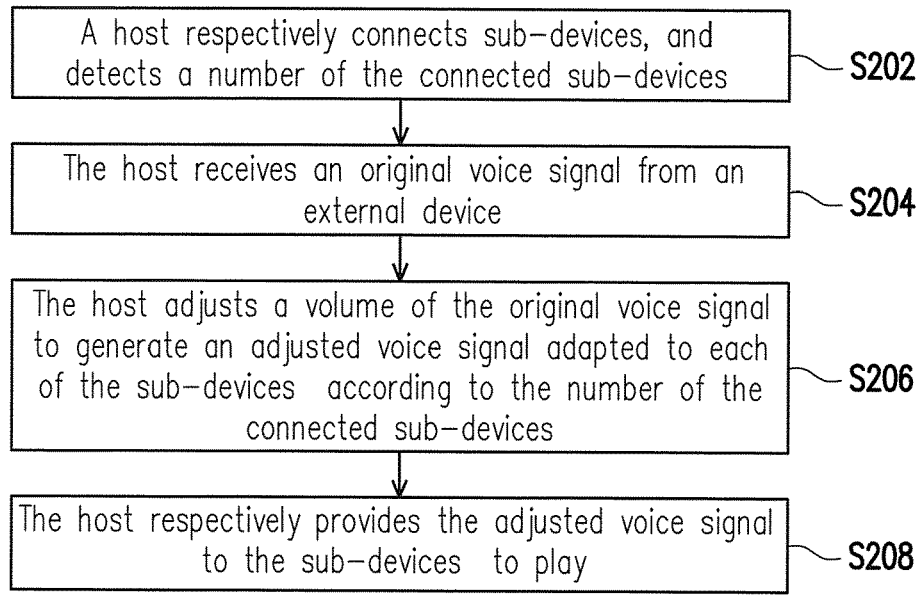
FIG. 2 is a flowchart illustrating a method for adjusting a volume of a conference call according to an embodiment of the invention.

Regarding a voice signal received from the external device, FIG. 2 is a flowchart illustrating a method for adjusting a volume of a conference call according to an embodiment of the invention. Referring to FIG. 1 and FIG. 2, the method of the present embodiment is adapted to the conference call volume adjusting system 10 of FIG. 1, and is adapted to adjust volumes of the host 11 and at least one sub-device (for example, the sub-devices 12-15) in the conference call. Detailed steps of the method for adjusting a volume of a conference call are described below with reference to various devices in the conference call volume adjusting system 10 of FIG. 1.

First, the host 11 respectively connects the sub-devices 12-15 through the aforementioned wireless communication techniques or wired interfaces, and detects a number of the connected sub-devices (step S202). The host 11, for example, executes conference call software to initialize a conference call, and invites or provides the sub-device 11 to join. In detail, in an embodiment, the host 11 may actively detect the sub-devices 12-15 located within a same network domain or located within a wireless signal range thereof so as to establish connections and add the sub-devices 12-15 to the conference call. In another embodiment, the sub-devices 12-15 may respectively detect the host 11, and establish connections with the host 11 so as to join in the conference call, where the method for establishing the connections is not limited by the invention.

Then, the host 11 establishes the conference call with an external device (not shown) to receive an original voice signal from the external device (step S204), where the host 11, for example, makes a phone call to the external device or answers a phone call of the external device through a conventional Public Switched Telephone Network (PSTN) to establish the conference call, or makes the phone call to the external device or answers the phone call of the external device to establish the conference call through a communication technique such as Global System for Mobile Communication (GSM), Personal Handy-phone System (PHS), Code Division Multiple Access (CDMA), Wireless Fidelity (Wi-Fi), or Worldwide Interoperability for Microwave Access (WiMAX), which is not limited by the invention.

Then, the host 11 adjusts a volume of the original voice signal according to the number of the connected sub-devices to generate an adjusted voice signal adapted to each of the sub-devices 12-15 (step S206). Due to the problem of excessive volume probably generated when the sub-devices 12-15 simultaneously play the original voice signal of the external device, the host 11, for example, inquires a predetermined volume mapping table first to find a volume threshold adapted to the current number of the sub-devices, and accordingly adjusts the voice signal adapted to each of the sub-devices.

Figure 3:
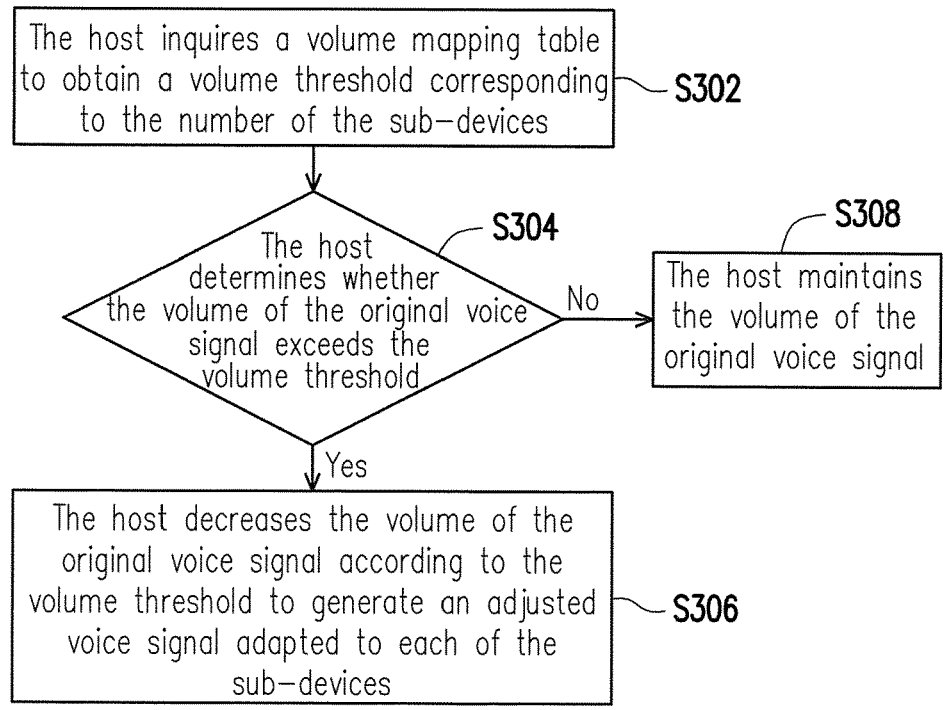
FIG. 3 is a flowchart illustrating a method for adjusting a volume of a conference call according to an embodiment of the invention.

In detail, FIG. 3 is a flowchart illustrating a method for adjusting a volume of a conference call according to an embodiment of the invention. Referring to FIG. 1 and FIG. 3, after the host 11 receives the original voice signal from the external device, before transmitting the original voice signal to the sub-devices 12-15, the host 11 first inquires the volume mapping table to obtain the volume threshold corresponding to the number of the sub-devices (step S302). Regarding the volume mapping table, in the present embodiment, a predetermined number of devices are, for example, preset in a predetermined space (for example, a conference room), and a same audio signal is simultaneously played on the devices so as to measure a summation volume during the playing, and by comparing the summation volume with and a proper volume upper limit of human hearing, a volume threshold of the audio signal suitable for being played on each of the devices under such number of the devices can be deduced. By repeating the above experiment based on different number of the devices, the volume thresholds suitable for different number of the devices can be obtained so as to generate the volume mapping table.

Then, the host 11 compares a volume of the original voice signal received from the external device with the volume threshold to determine whether the volume of the original voice signal exceeds the volume threshold (step S304). If the host 11 determines that the volume of the original voice signal exceeds the volume threshold, the host 11 decreases the volume of the original voice signal according to the volume threshold to generate an adjusted voice signal adapted to each of the sub-devices 12-15 (step S306). Conversely, the host 11 maintains the volume of the original voice signal (step S308).

In detail, regarding the situation that the volume of the original voice signal exceeds the volume threshold, in an embodiment, the host 11 may directly decrease the volume of the original voice signal to the volume threshold to serve as the adjusted voice signal adapted to each of the sub-devices 12-15. In another embodiment, the host 11 may decrease the volume of the original voice signal in proportion according to a decibel of a loudspeaker of each of the sub-devices to serve as the adjusted voice signal adapted to each of the sub-devices 12-15. In detail, the host 11, for example first obtains a decibel that can be produced by the loudspeaker of each of the sub-devices 12-15, and decreases the volume of the original voice signal according to a proportion of the decibels of the sub-devices 12-15 to generate the adjusted voice signal adapted to each of the sub-devices 12-15. It should be noted that the host 11, for example, obtains a hardware specification of each of the sub-devices 12-15 from Service Set Identifier (SSID) related information of each of the sub-devices 12-15, so as to obtain the decibel of the loudspeaker of each of the sub-devices 12-15. When the volume of the voice signal adapted to each of the sub-devices 12-15 is adjusted, the host 11, for example, calculates a difference between the volume of the original voice signal and the volume threshold, and multiplies the difference by the number of the host and the sub-devices to obtain a magnitude of a total volume to be decreased, and then proportionally distributes the magnitude of the total volume to be decreased to the host 11 and each of the sub-devices 12-15 according to the decibels of the sub-devices 12-15, so as to generate the adjusted voice signal adapted to each of the sub-devices 12-15.

Referring back to the flow of FIG. 2, after the host 11 generates the adjusted voice signal adapted to each of the sub-devices 12-15, the host 11 respectively provides the adjusted voice signal to the sub-devices 12-15 to play (step S208).

Figure 4:
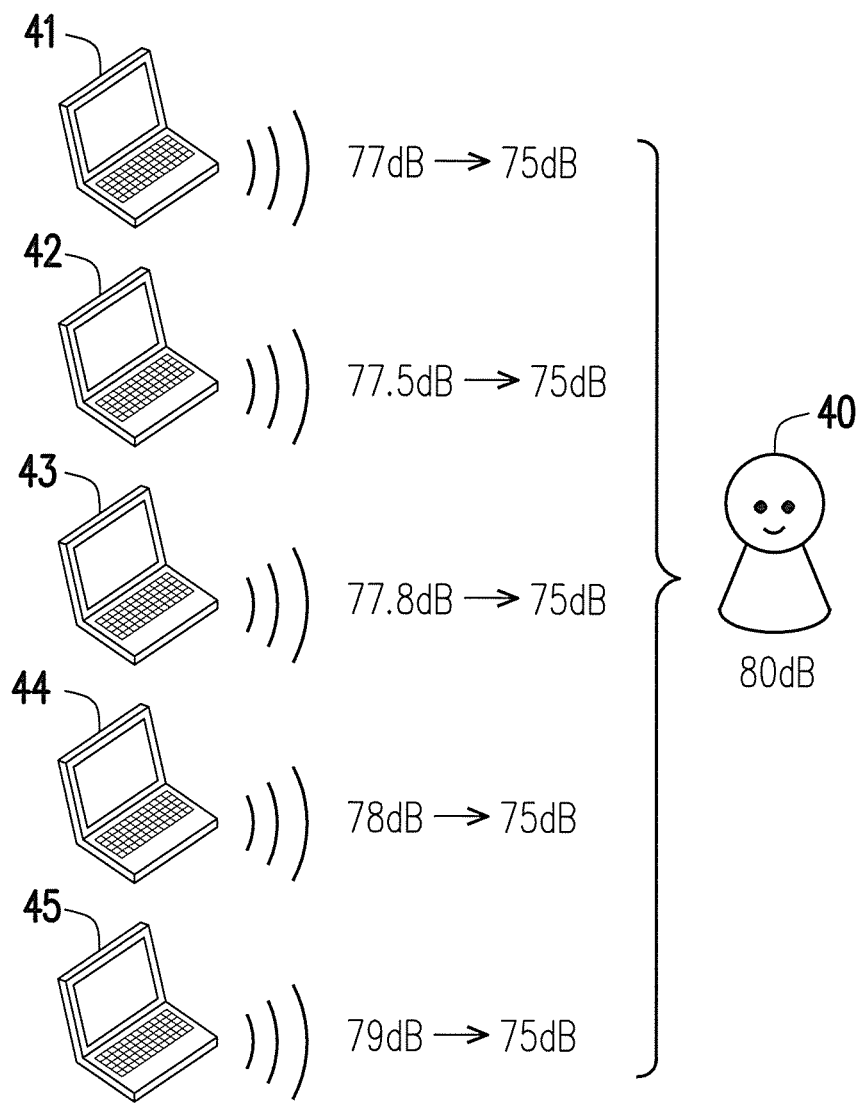
FIG. 4 is an example of a method for adjusting a volume of a conference call according to an embodiment of the invention.

For example, FIG. 4 is an example of the method for adjusting a volume of a conference call according to an embodiment of the invention. Referring to FIG. 4, after a host 41 receives the original voice signal from the external device, the host 41 first obtains decibels capable of being produced by the loudspeakers of the host 11 and sub-devices 42-45, and estimates volumes of the original voice signals played by the host 41 and the sub-devices 42-45 to be 77, 77.5, 77.8, 78 and 79 dB, and after the above volumes are summed, a volume of 82 dB is produced, which may cause discomfort of human hearing. Therefore, the host 41 inquires the volume mapping table to find a volume threshold of 75 dB suitable for 5 devices, and decreases the volume of the original voice signal according to a proportion of the decibels of the host 41 and each of the sub-devices 42-45 to generate an adjusted voice signal adapted to the host 41 and each of the sub-devices 42-45, and finally transmits the adjusted voice signal to each of the sub-devices 42-45 to play. As shown in FIG. 4, the volumes of the adjusted voice signal played by the host 41 and each of the sub-devices 42-45 are all 75 dB, and after these volumes are summed, only a volume of about 80 dB is produced, which is within a tolerable range of human hearing.

According to the above method, the volume of the original voice signal received from the external device in the conference call is suitably decreased for being evenly distributed to or proportionally distributed to the host and each of the sub-devices to play, and finally a volume summation of the voices played by the devices and heard by the participants is within an acceptable volume range.

Figure 5:
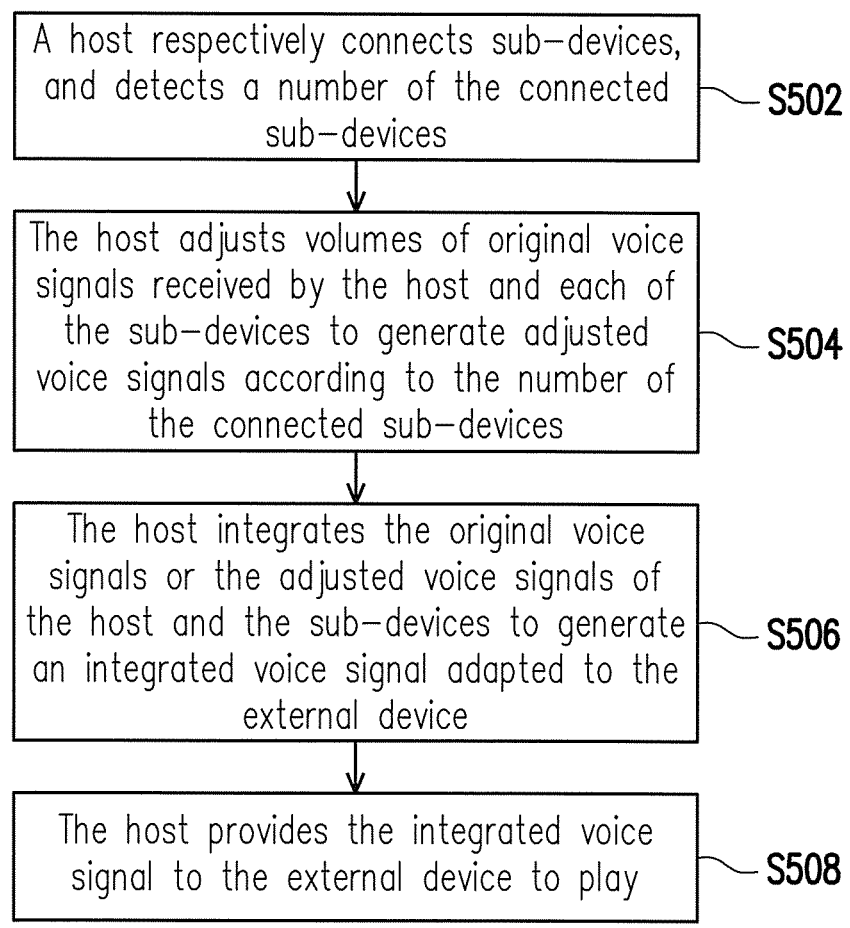
FIG. 5 is a flowchart illustrating a method for adjusting a volume of a conference call according to an embodiment of the invention.

On the other hand, regarding a voice signal to be output to the external device, FIG. 5 is a flowchart illustrating a method for adjusting a volume of a conference call according to an embodiment of the invention. Referring to FIG. 1 and FIG. 5, the method of the present embodiment is adapted to the conference call volume adjusting system 10 of FIG. 1, and is adapted to adjust volumes of the host 11 and at least one sub-device (for example, the sub-devices 12-15) in the conference call. Detailed steps of the method for adjusting a volume of a conference call are described below with reference to various devices in the conference call volume adjusting system 10 of FIG. 1.

First, the host 11 respectively connects the sub-devices 12-15 through the aforementioned wireless communication techniques or wired interfaces, and detects a number of the connected sub-devices (step S502). The above step is the same as or similar to the step S202 of the aforementioned embodiment, so that detail thereof is not repeated.

Then, the host 11 establishes a conference call with the external device, and adjusts volumes of original voice signals received by the host 11 and each of the sub-devices 12-15 according to the number of the connected sub-devices to generate adjusted voice signals (step S504). The method that the host 11 establishes the conference call with the external device is the same as or similar to that in the aforementioned embodiment, so that detail thereof is not repeated.

Different from the aforementioned embodiment, in the present embodiment, the host 11 or each of the sub-devices 12-15 inquires a predetermined volume mapping table to obtain a proper volume threshold corresponding to the number of the sub-devices, and accordingly adjusts the volume of the received original voice signal to generate the adjusted voice signal. In other words, similar to the volume summation concept of multiple devices of the aforementioned embodiment, since the host 11 may collect and integrate the original voice signals received by the host 11 and the sub-devices 12-15, a summation of the volumes of the original voice signals probably exceeds a proper volume upper limit of human hearing, so that a volume threshold adapted to the original voice signal collected from each of the devices under the number of the devices can be deduced according to the number of the sub-devices and the volume upper limit.

Therefore, the host 11 or each of the sub-devices 12-15 may compare the volume of the received original voice signal with the volume threshold to determine whether the volume of the original voice signal exceeds the volume threshold. If it is determined that the volume of the original voice signal exceeds the volume threshold, the host 11 or each of the sub-devices 12-15 may decrease the volume of the original voice signal according to the volume threshold so as to generate the adjusted voice signal. Conversely, the host 11 may maintain the volume of the original voice signal.

Then, the host 11 integrates the original voice signals or the adjusted voice signals (if adjusted) of the host 11 and the sub-devices 12-15 to generate an integrated voice signal adapted to the external device (step S506), and provides the integrated voice signal to the external device to play (step S508).

Figure 6:
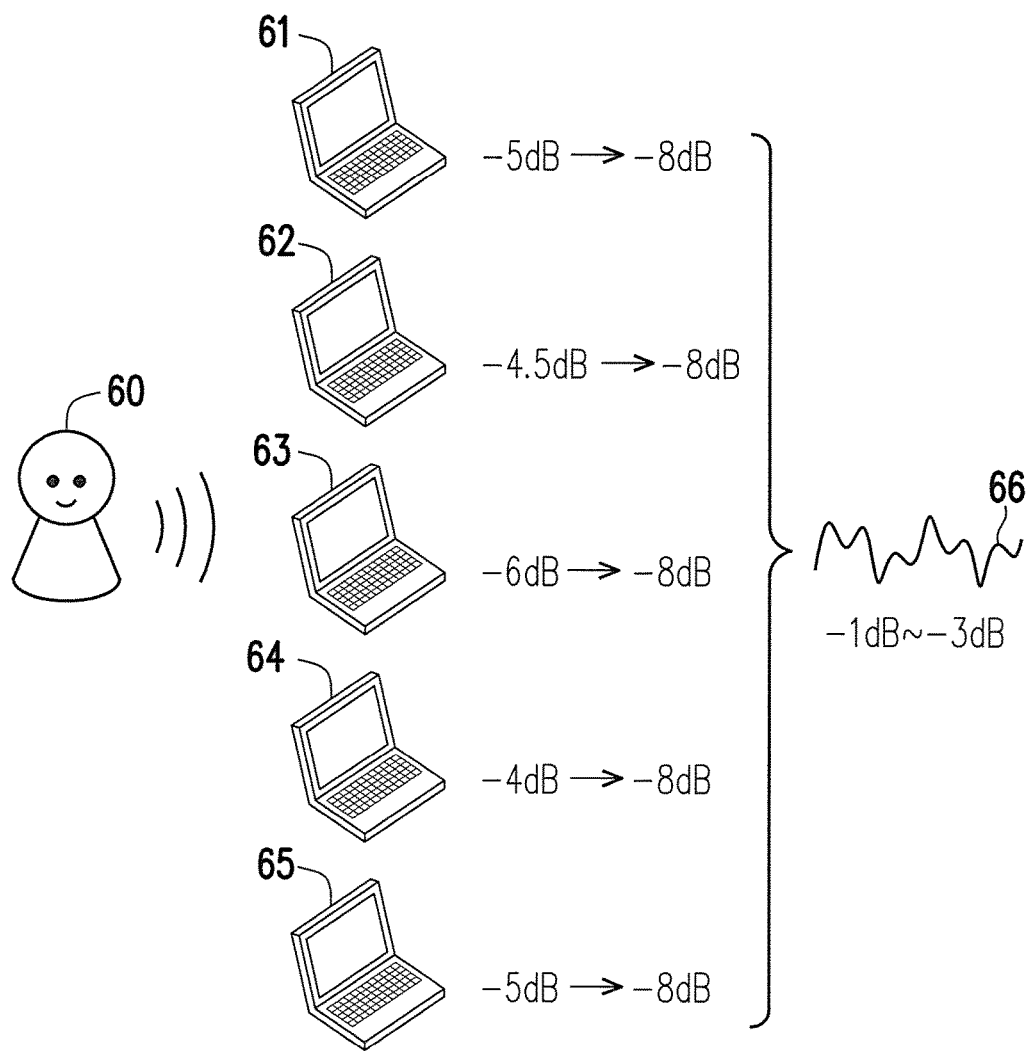
FIG. 6 is an example of a method for adjusting a volume of a conference call according to an embodiment of the invention.

For example, FIG. 6 is an example of the method for adjusting a volume of a conference call according to an embodiment of the invention. Referring to FIG. 6, when a participant 60 participating in the conference call talks, a host 61 and sub-devices 62-65 respectively receive original voice signals, and volumes thereof are respectively −5, −4.5, −6, −4 and −5 dB. After the volumes are summed, a volume of 0 dB with a distortion is produced. Therefore, the host 61 inquires the volume mapping table to find a proper volume threshold of −8 dB corresponding to the 5 devices, so as to decrease the volumes of the original voice signals received by the host 61 and the sub-devices 62-65 to the volume threshold. In this way, after the host 61 integrates the adjusted voice signals of the host 61 and each of the sub-devices 62-65, an integrated voice signal 66 with a volume of about −1 to −3 dB is generated, so that when the integrated voice signal 66 is sent to the external device to play, the volume thereof can be controlled within a tolerable range of human hearing. In the present embodiment, the volume of a negative value is another expression of volume, which is defined as an original volume value (a positive value) minus the proper volume upper limit of human hearing (a positive value), and is used for representing a difference between the original volume and the proper volume upper limit of human hearing, so that it can be a negative value. Therefore, through the known proper volume upper limit of human hearing, volume values of other embodiments of the invention can be converted into volume values of the present embodiment.

According to the above method, the volumes of the original voice signals received by each of the devices in the conference call can be properly decreased for being integrated into the integrated voice signal adapted to the external device, so that a volume of the integrated voice signal played on the external device can be maintained within the acceptable volume range.

It should be noted that in the aforementioned embodiment, adjustment of the volumes of the original voice signals can be executed by the host 11 in a unified manner or respectively executed by the host 11 and each of the sub-devices 12-15, which are respectively described in detail below.

Figure 7:
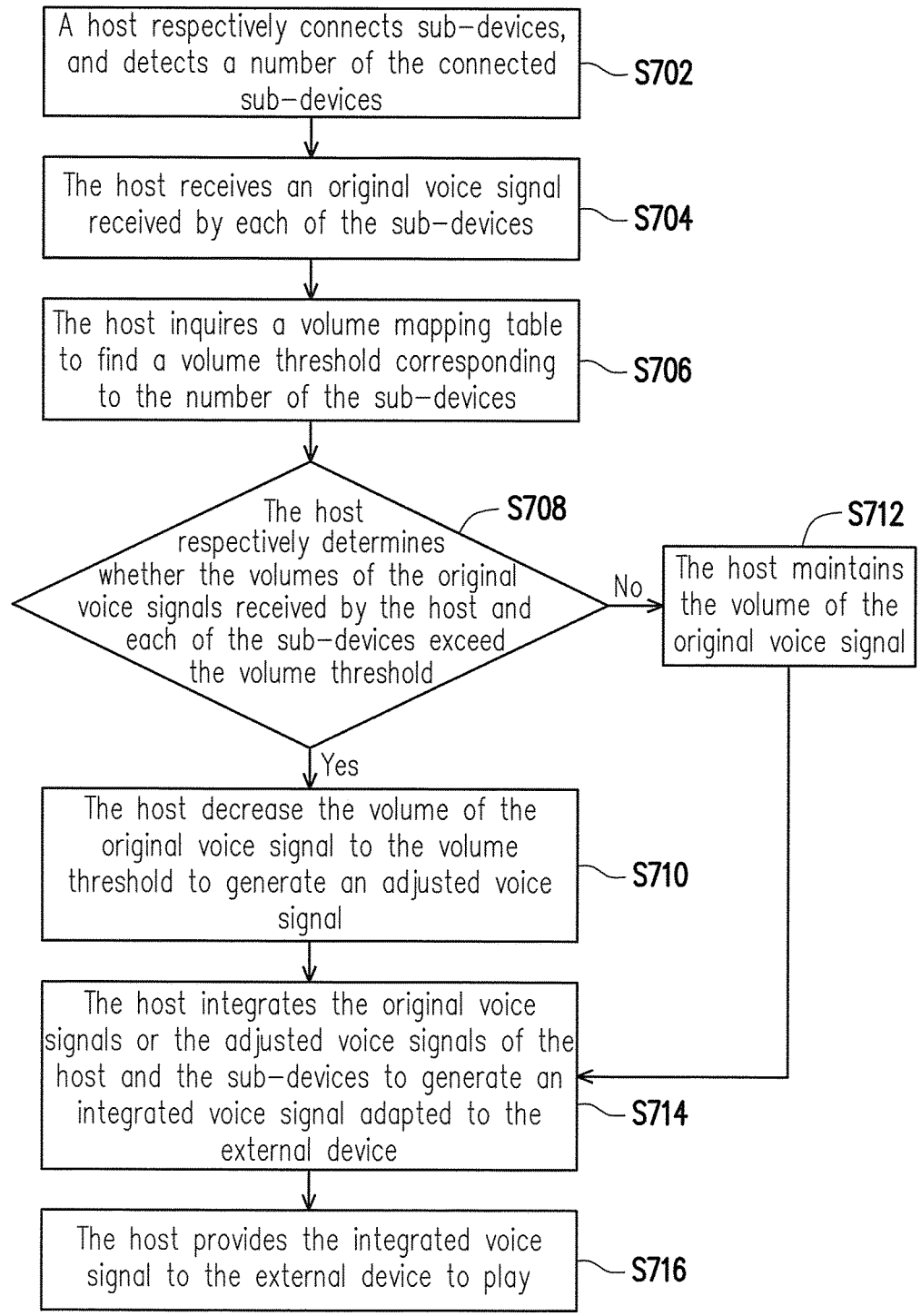
FIG. 7 is a flowchart illustrating a method for adjusting a volume of a conference call according to an embodiment of the invention.

In case that the host 11 adjust the volumes in the unified manner, FIG. 7 is a flowchart illustrating a method for adjusting a volume of a conference call according to an embodiment of the invention. Referring to FIG. 1 and FIG. 7, the method of the present embodiment is adapted to the conference call volume adjusting system 10 of FIG. 1, and is adapted to adjust volumes of the host 11 and at least one sub-device (for example, the sub-devices 12-15) in the conference call. Detailed steps of the method for adjusting a volume of a conference call are described below with reference to various devices in the conference call volume adjusting system 10 of FIG. 1.

First, the host 11 respectively connects the sub-devices 12-15 through the aforementioned wireless communication techniques or wired interfaces, and detects a number of the connected sub-devices (step S702). The above step is the same as or similar to the step S202 of the aforementioned embodiment, so that detail thereof is not repeated.

Then, the host 11 receives original voice signals received by each of the sub-devices 12-15 (step S704), and inquires a predetermined volume mapping table to find a volume threshold corresponding to the number of the sub-devices (step S706), where the method of inquiring the predetermined volume mapping table to find the volume threshold is the same as or similar to that in the aforementioned embodiment, so that detail thereof is not repeated.

Then, the host 11 respectively determines whether the volumes of the original voice signals received by the host 11 and each of the sub-devices 12-15 exceed the volume threshold (step S708). If it is determined that the volume of the original voice signal exceeds the volume threshold, the host 11 decreases the volume of the original voice signal to the volume threshold so as to generate an adjusted voice signal (step S710). Conversely, the host 11 maintains the volume of the original voice signal (step S712).

Finally, the host 11 integrates the original voice signals or the adjusted voice signals (if adjusted) of the host 11 and each of the sub-devices 12-15 to generate an integrated voice signal adapted to the external device (step S714), and provides the integrated voice signal to the external device to play (step S716).

According to the above method, the host 11 may adjust the voice signals received by the host 11 and all of the sub-devices in the unified manner for being integrated into the voice signal adapted to the external device, such that a volume of the integrated voice signal played on the external device can be maintained within the acceptable volume range.

Figure 8:
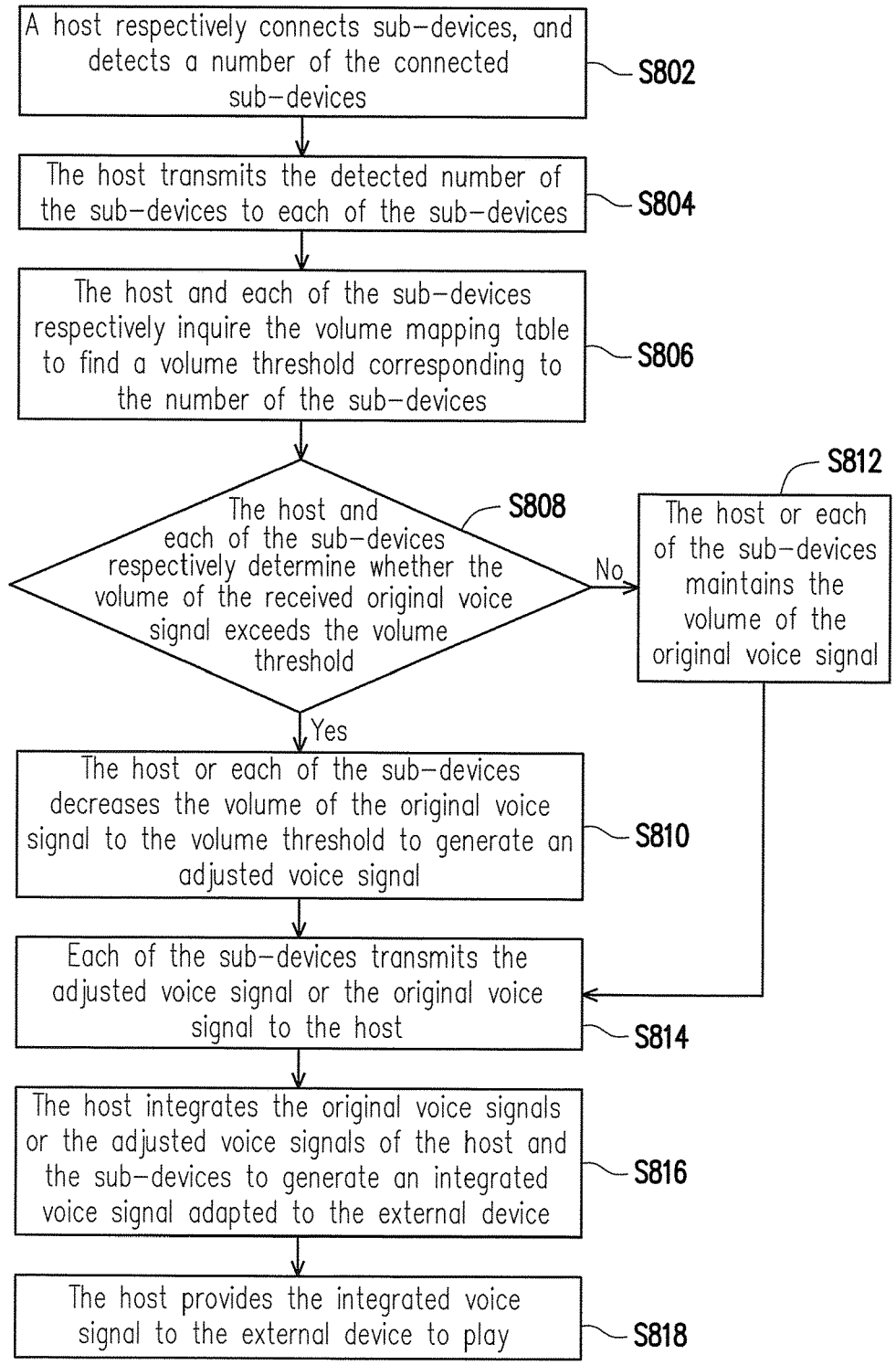
FIG. 8 is a flowchart illustrating a method for adjusting a volume of a conference call according to an embodiment of the invention.

On the other hand, in case that the host and the sub-devices respectively adjust the volumes, FIG. 8 is a flowchart illustrating a method for adjusting a volume of a conference call according to an embodiment of the invention. Referring to FIG. 1 and FIG. 8, the method of the present embodiment is adapted to the conference call volume adjusting system 10 of FIG. 1, and is adapted to adjust volumes of the host 11 and at least one sub-device (for example, the sub-devices 12-15) in the conference call. Detailed steps of the method for adjusting a volume of a conference call are described below with reference to various devices in the conference call volume adjusting system 10 of FIG. 1.

First, the host 11 respectively connects the sub-devices 12-15 through the aforementioned wireless communication techniques or wired interfaces, and detects a number of the connected sub-devices (step S802). The above step is the same as or similar to the step S202 of the aforementioned embodiment, so that detail thereof is not repeated.

Different from the aforementioned embodiment, in the present embodiment, after the host 11 detects the number of the connected sub-devices, the host 11 transmits the number of the sub-devices to each of the sub-devices 12-15 (step S804). The host 11 and each of the sub-devices 12-15 respectively inquire the volume mapping table to find a volume threshold corresponding to the number of the sub-devices (step S806). The method of inquiring the volume mapping table to find the volume threshold is the same as or similar to that in the aforementioned embodiment, so that detail thereof is not repeated.

Then, the host 11 and each of the sub-devices 12-15 respectively determine whether the volume of the received original voice signal exceeds the volume threshold (step S808). If the host 11 or each of the sub-devices 12-15 determines that the volume of the original voice signal exceeds the volume threshold, the host 11 or each of the sub-devices 12-15 decreases the volume of the original voice signal to the volume threshold so as to generate an adjusted voice signal (step S810). Conversely, the host 11 or each of the sub-devices 12-15 maintains the volume of the original voice signal (step S812).

After the aforementioned adjustment is completed, each of the sub-devices 12-15 transmits the adjusted voice signal (adjusted) or the original voice signal (non-adjusted) to the host 11 (step S814). Finally, the host 11 integrates the original voice signals or the adjusted voice signals of the host 11 and each of the sub-devices 12-15 to generate an integrated voice signal adapted to the external device (step S816), and provides the integrated voice signal to the external device to play (step S818).

According to the above method, the host and the sub-devices may respectively adjust the received voice signals, and the adjusted voice signals are finally integrated into the voice signal adapted to the external device, such that a volume of the integrated voice signal played on the external device can be maintained within the acceptable volume range.

In summary, in the method and the system for adjusting a volume of a conference call of the invention, by detecting the number of devices joining in the conference call in a same place, a proper volume threshold is determined, and by applying the same to the voice signals to be played by the devices or the voice signals collected by the devices, a volume generated when the devices simultaneously play the voice signals and a volume generated when the external device plays the voice signals collected by the devices can be maintained within the acceptable volume range.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for adjusting a volume of a conference call, adapted to adjust voice volumes by a host for providing to a plurality of sub-devices located in a same place and participating in the conference call, comprising:
   respectively connecting the plurality of sub-devices located in the same place with the host, and detecting a number of the connected sub-devices by the host;
   receiving an original voice signal from an external device establishing the conference call with the host by the host;
   adjusting a voice volume of the original voice signal according to the number of the connected sub-devices by the host to generate an adjusted voice signal adapted to each of the plurality of sub-devices, comprising:
      inquiring a volume mapping table to obtain a volume threshold corresponding to the number of the sub-devices by the host;
      determining whether the voice volume of the original voice signal exceeds the volume threshold by the host; and
      decreasing the voice volume of the original voice signal according to the volume threshold by the host to generate the adjusted voice signal adapted to each of the sub-devices if the voice volume of the original voice signal exceeds the volume threshold; and
   respectively transmitting the adjusted voice signal to the plurality of sub-devices to play by the host,
   wherein the step of decreasing the voice volume of the original voice signal according to the volume threshold by the host to generate the adjusted voice signal adapted to each of the sub-devices comprising:
   obtaining a decibel (dB) capable of being produced by a loudspeaker of each of the sub-devices by the host; and
   decreasing the voice volume of the original voice signal according to a proportion of the decibels of the sub-devices by the host to generate the adjusted voice signal adapted to each of the sub-devices.

2. The method as claimed in claim 1, wherein the step of decreasing the voice volume of the original voice signal according to the volume threshold by the host to generate the adjusted voice signal adapted to each of the sub-devices comprising:
   decreasing the voice volume of the original voice signal to the volume threshold by the host to serve as the adjusted voice signal adapted to each of the sub-devices.

3. A conference call volume adjusting system, comprising:
   a plurality of sub-devices; and
   a host, respectively connecting the plurality of sub-devices located in a same place as the host and participating in a conference call, and detecting a number of the connected sub-devices,
   wherein the host adjusts a voice volume of an original voice signal received from an external device establishing the conference call with the host according to the number of the connected sub-devices to generate an adjusted voice signal adapted to each of the plurality of sub-devices, and provides the adjusted voice signal to the plurality of sub-devices to play, wherein the host inquires a volume mapping table to obtain a volume threshold corresponding to the number of the sub-devices, determines whether the voice volume of the original voice signal exceeds the volume threshold, and decreases the voice volume of the original voice signal according to the volume threshold to generate the adjusted voice signal adapted to each of the sub-devices if the voice volume of the original voice signal exceeds the volume threshold,
   wherein the host obtains a decibel (dB) capable of being produced by a loudspeaker of each of the sub-devices, and decreases the voice volume of the original voice signal according to a proportion of the decibels of the sub-devices to generate the adjusted voice signal adapted to each of the sub-devices, and
   the host adjusts voice volumes of the original voice signals received by the host and each of the plurality of sub-devices according to the number of the sub-devices, integrates the original voice signals into an integrated voice signal adapted to the external device, and provides the integrated voice signal to the external device to play.

4. The system as claimed in claim 3, wherein the host decreases the voice volume of the original voice signal to the volume threshold to serve as the adjusted voice signal adapted to each of the sub-devices.

5. The system as claimed in claim 3, wherein the host receives the original voice signal of each of the sub-devices, and adjusts the voice volumes of the original voice signals of the host and each of the sub-devices according to the number of the connected sub-devices.

6. The system as claimed in claim 5, wherein the host inquires the volume mapping table to obtain the volume threshold corresponding to the number of the sub-devices, and respectively determines whether the voice volumes of the original voice signals of the host and each of the sub-devices exceed the volume threshold, and decreases the voice volumes of the original voice signals to the volume threshold if the voice volumes exceeds the volume threshold.

7. The system as claimed in claim 3, wherein the host transmits the number of the connected sub-devices to each of the sub-devices, and each of the sub-devices adjusts the voice volume of the original voice signal according to the number of the sub-devices and transmits the adjusted voice volume to the host.

8. The system as claimed in claim 7, wherein each of the sub-devices inquires the volume mapping table to obtain the volume threshold corresponding to the number of the sub-devices, determines whether the voice volume of the original voice signal exceeds the volume threshold, and decreases the voice volume of the original voice signal to the volume threshold if the voice volume of the original voice signal exceeds the volume threshold.

* * * * *